(12) United States Patent
Kwon et al.

(10) Patent No.: US 11,943,665 B2
(45) Date of Patent: Mar. 26, 2024

(54) APPARATUS AND METHODS FOR POWER SAVE IN MULTI-LINK WIRELESS SYSTEMS

(71) Applicant: NXP USA, Inc., Austin, TX (US)

(72) Inventors: Young Hoon Kwon, Laguna Niguel, CA (US); Liwen Chu, San Ramon, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 82 days.

(21) Appl. No.: 17/337,995

(22) Filed: Jun. 3, 2021

(65) Prior Publication Data

US 2021/0385692 A1 Dec. 9, 2021

Related U.S. Application Data

(60) Provisional application No. 63/090,839, filed on Oct. 13, 2020, provisional application No. 63/046,207, (Continued)

(51) Int. Cl.
*H04W 28/24* (2009.01)
*H04W 40/24* (2009.01)
(Continued)

(52) U.S. Cl.
CPC .......... *H04W 28/24* (2013.01); *H04W 40/244* (2013.01); *H04W 52/0229* (2013.01);
(Continued)

(58) Field of Classification Search
CPC ..... H04W 28/24; H04W 76/15; H04W 76/11; H04W 40/244; H04W 52/0235; H04W 52/0229
See application file for complete search history.

(56) References Cited

U.S. PATENT DOCUMENTS

2015/0103767 A1* 4/2015 Kim .................. H04W 74/06
370/329
2020/0120603 A1 4/2020 Seok et al.
(Continued)

OTHER PUBLICATIONS

Minyoung Park, et al., "Multi-link TIM—Follow up," IEEE 802.11-20/0084r1—Apr. 10, 2020; 9 pgs.
(Continued)

*Primary Examiner* — Jianye Wu

(57) ABSTRACT

Various embodiments relate to a method for power save operation by a non-access point (non-AP) multi-link device (MLD), wherein a plurality of links are established between the non-AP MLD and an AP MLD, including: setting, by the non-AP MLD, a QoS capability for a first access category to a first state on all links of the plurality of links that the non-AP MLD operates; transmitting, by the non-AP MLD, a first management frame to the AP MLD, wherein the first management frame is used to request a multi-link setup with the AP MLD, and wherein the first management frame includes a first element that comprises the setting of the QoS capability for the first access category; receiving, by the non-AP MLD, a second management frame from the AP MLD, wherein the second management frame includes information for an association ID (AID) that corresponds to the non-AP MLD, wherein the AID is assigned to the non-AP MLD regardless of the number of links in the plurality of links; and receiving, by the non-AP MLD, a third management frame from the AP MLD, wherein the third management frame comprises a partial virtual bitmap and a bit in the partial virtual bitmap corresponds to the AID is set to indicate if the first state is a nondelivery-enabled access category and the AP MLD has buffered buffer units (BU) of the first access category for the non-AP MLD.

30 Claims, 12 Drawing Sheets

Related U.S. Application Data filed on Jun. 30, 2020, provisional application No. 63/033,914, filed on Jun. 3, 2020.

(51) Int. Cl.
    *H04W 52/02*     (2009.01)
    *H04W 76/11*     (2018.01)
    *H04W 76/15*     (2018.01)

(52) U.S. Cl.
    CPC ........ *H04W 52/0235* (2013.01); *H04W 76/11* (2018.02); *H04W 76/15* (2018.02)

(56)     References Cited

U.S. PATENT DOCUMENTS

2021/0029588 A1*   1/2021   Cariou ............... H04W 28/0263
2022/0217797 A1*   7/2022   Kim .................. H04W 28/0268

OTHER PUBLICATIONS

Minyoung Park, et al., "Multi-link Power Save—Link Bitmap," IEEE 802.11-20/0085rl—Jan. 9, 2020; 10 pgs.
Minyoung Park, et al., "Multi-link Power Save Operation," IEEE 802.11-19/1544r5—Jan. 16, 2020; 18 pgs.

\* cited by examiner

APPARATUS AND METHODS FOR POWER SAVE IN MULTI-LINK WIRELESS SYSTEMS

CROSS-REFERENCE TO RELATED APPLICATIONS

This application claims benefit to U.S. Provisional Patent Application Nos. 63/033,914 filed on Jun. 3, 2020, 63/046,207 filed on Jun. 30, 2020, and 63/090,839 filed on Oct. 13, 2020, the contents of each which are hereby incorporated by reference for all purposes as if fully set forth herein.

TECHNICAL FIELD

Various exemplary embodiments disclosed herein relate generally to apparatus and methods for power save in multi-link wireless systems.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for power save operation by a non-access point (non-AP) multi-link device (MLD), wherein a plurality of links are established between the non-AP MLD and an AP MLD, including: setting, by the non-AP MLD, a QoS capability for a first access category to a first state on all links of the plurality of links that the non-AP MLD operates; transmitting, by the non-AP MLD, a first management frame to the AP MLD, wherein the first management frame is used to request a multi-link setup with the AP MLD, and wherein the first management frame includes a first element that comprises the setting of the QoS capability for the first access category; receiving, by the non-AP MLD, a second management frame from the AP MLD, wherein the second management frame includes information for an association ID (AID) that corresponds to the non-AP MLD, wherein the AID is assigned to the non-AP MLD regardless of the number of links in the plurality of links; and receiving, by the non-AP MLD, a third management frame from the AP MLD, wherein the third management frame comprises a partial virtual bitmap and a bit in the partial virtual bitmap corresponds to the AID is set to indicate if the first state is a nondelivery-enabled access category and the AP MLD has buffered buffer units (BU) of the first access category for the non-AP MLD.

Various embodiments are described, wherein the first management frame is an Association Request frame.

Various embodiments are described, wherein the second management frame is an Association Response frame.

Various embodiments are described, wherein the third management frame is a Beacon frame.

Various embodiments are described, further including: setting, by the non-AP MLD, the QoS capability for a second access category to a second state on all links of the plurality of links that the non-AP MLD operates; and wherein the partial virtual bitmap and a bit in the partial virtual bitmap corresponds to the AID is set to indicate if the first and the second states are nondelivery-enabled access categories and the AP MLD has buffered BU of the first or the second access categories for the non-AP MLD.

Various embodiments are described, wherein the QoS capability is indicated in a QoS Capability element of the first management frame.

Various embodiments are described, wherein the QoS capability for the first access category is 1 bit in length and set to 1 to indicate that the first access category is both trigger-enabled and delivery-enabled.

Various embodiments are described, further comprising setting, by the non-AP MLD, a QoS capability for a traffic stream parameters to a value on all links of the plurality of links that the non-AP MLD operates.

Various embodiments are described, further comprising setting, by the non-AP MLD, a QoS capability for a Max service period (SP) Length to a value on all links of the plurality of links that the non-AP MLD operates.

Various embodiments are described, further comprising transmitting, by the non-AP MLD, an add traffic stream (ADDTS) Request frame for an AC to the AP MLD, wherein an automatic power save delivery (APSD) subfield and the Schedule subfield value for the plurality of links shall be set to the same value.

Further various embodiments relate to a method for power save operation by a non-access point (non-AP) multi-link device (MLD), wherein a plurality of links are established between the non-AP MLD and an AP MLD, including: setting, by the non-AP MLD, a listen interval value to a first value on all links of the plurality of links that the non-AP MLD operates; transmitting, by the non-AP MLD, a first management frame to the AP MLD, wherein the first management frame is used to request a multi-link setup with the AP MLD, and wherein the first management frame includes a first field including the listen interval value set to the first value; receiving, by the non-AP MLD, a second management frame from the AP MLD, wherein the second management frame includes information for an association ID (AID) that corresponds to the non-AP MLD, wherein the AID is assigned to the non-AP MLD regardless of the number of links in the plurality of links; and receiving, by the non-AP MLD, a Beacon frame during the listen interval.

Various embodiments are described, wherein the first management frame is one of an Association Request frame and a Reassociation Request frame.

Various embodiments are described, wherein the first field indicates how often the non-AP MLD in power save mode wakes to listen to Beacon frames.

Various embodiments are described, wherein the Beacon frames may be on any of the plurality of links.

Further various embodiments relate to a method for power save operation by a non-access point (non-AP) multi-link device (MLD), wherein a plurality of links are established between the non-AP MLD and an AP MLD, including: setting, by the non-AP MLD, a wireless network monitor (WNM) Sleep interval value to a first value on all links of the plurality of links that the non-AP MLD operates; transmitting, by the non-AP MLD, a first management frame to the AP MLD, wherein the first management frame is used to enter the WNM sleep mode, and wherein the first management frame includes a WNM Sleep Interval field including the WNM Sleep interval value set to the first value; and receiving, by the non-AP MLD, a Beacon frame during the WNM Sleep interval.

Various embodiments are described, wherein the first management frame is a WNM Sleep Mode Request frame.

Various embodiments are described, wherein a WNM Sleep Interval field indicates how often the non-AP MLD in WNM sleep mode wakes to listen to Beacon frames.

Various embodiments are described, wherein the Beacon frames may be on any of the plurality of links.

Various embodiments are described, wherein the first management frame includes only one WNM Sleep Interval field.

Various embodiments relate to a non-access point (non-AP) multi-link device (MLD) that includes power save operation, wherein a plurality of links are established between the non-AP MLD and an AP MLD, including: a processor configured to set a QoS capability for a first access category to a first state on all links of the plurality of links that the non-AP MLD operates; a transmitter configured to transmit a first management frame to the AP MLD, wherein the first management frame is used to request a multi-link setup with the AP MLD, and wherein the first management frame includes a first element that comprises the setting of the QoS capability for the first access category; and a receiver configured to: receive a second management frame from the AP MLD, wherein the second management frame includes information for an association ID (AID) that corresponds to the non-AP MLD, wherein the AID is assigned to the non-AP MLD regardless of the number of links in the plurality of links; and receive a third management frame from the AP MLD, wherein the third management frame comprises a partial virtual bitmap and a bit in the partial virtual bitmap corresponds to the AID is set to indicate if the first state is a nondelivery-enabled access category and the AP MLD has buffered buffer units (BU) of the first access category for the non-AP MLD.

Various embodiments are described, wherein the first management frame is an Association Request frame.

Various embodiments are described, wherein the second management frame is an Association Response frame.

Various embodiments are described, wherein the third management frame is a Beacon frame.

Various embodiments are described, wherein the processor is further configured to: set the QoS capability for a second access category to a second state on all links of the plurality of links that the non-AP MLD operates, wherein the partial virtual bitmap and a bit in the partial virtual bitmap corresponds to the AID is set to indicate if the first and the second states are nondelivery-enabled access categories and the AP MLD has buffered BU of the first or the second access categories for the non-AP MLD.

Various embodiments are described, wherein the QoS capability is indicated in a QoS Capability element of the first management frame.

Various embodiments are described, wherein the QoS capability for the first access category is 1 bit in length and set to 1 to indicate that the first access category is both trigger-enabled and delivery-enabled.

Various embodiments are described, wherein the processor is further configured to set a QoS capability for a traffic stream parameters to a value on all links of the plurality of links that the non-AP MLD operates.

Various embodiments are described, wherein the processor is further configured to set a QoS capability for a Max service period (SP) Length to a value on all links of the plurality of links that the non-AP MLD operates.

Various embodiments are described, wherein the transmitter is further configured to transmit an add traffic stream (ADDTS) Request frame for an AC to the AP MLD, wherein an automatic power save delivery (APSD) subfield and the Schedule subfield value for the plurality of links shall be set to the same value.

Further various embodiments relate to a non-access point (non-AP) multi-link device (MLD) that includes power save operation, wherein a plurality of links are established between the non-AP MLD and an AP MLD, including: a processor configured to set a listen interval value to a first value on all links of the plurality of links that the non-AP MLD operates; a transmitter configured to transmit a first management frame to the AP MLD, wherein the first management frame is used to request a multi-link setup with the AP MLD, and wherein the first management frame includes a first field including the listen interval value set to the first value; a receiver configured to: receive a second management frame from the AP MLD, wherein the second management frame includes information for an association ID (AID) that corresponds to the non-AP MLD, wherein the AID is assigned to the non-AP MLD regardless of the number of links in the plurality of links; and receive a Beacon frame during the listen interval.

Various embodiments are described, wherein the first management frame is one of an Association Request frame and a Reassociation Request frame.

Various embodiments are described, wherein the first field indicates how often the non-AP MLD in power save mode wakes to listen to Beacon frames.

Various embodiments are described, wherein the Beacon frames may be on any of the plurality of links.

Further various embodiments relate to a non-access point (non-AP) multi-link device (MLD) that includes power save operation, wherein a plurality of links are established between the non-AP MLD and an AP MLD, including: a processor configured to set a wireless network monitor (WNM) Sleep interval value to a first value on all links of the plurality of links that the non-AP MLD operates; a transmitter configured to transmit a first management frame to the AP MLD, wherein the first management frame is used to enter the WNM sleep mode, and wherein the first management frame includes a WNM Sleep Interval subfield including the WNM Sleep interval value set to the first value; and a receiver configured to: receive a Beacon frame during the WNM Sleep interval.

Various embodiments are described, wherein the first management frame is a WNM Sleep Mode Request frame.

Various embodiments are described, wherein a WNM Sleep Interval field indicates how often the non-AP MLD in WNM sleep mode wakes to listen to Beacon frames.

Various embodiments are described, wherein the Beacon frames may be on any of the plurality of links.

Various embodiments are described, wherein the first management frame includes only one NMM Sleep Interval field.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
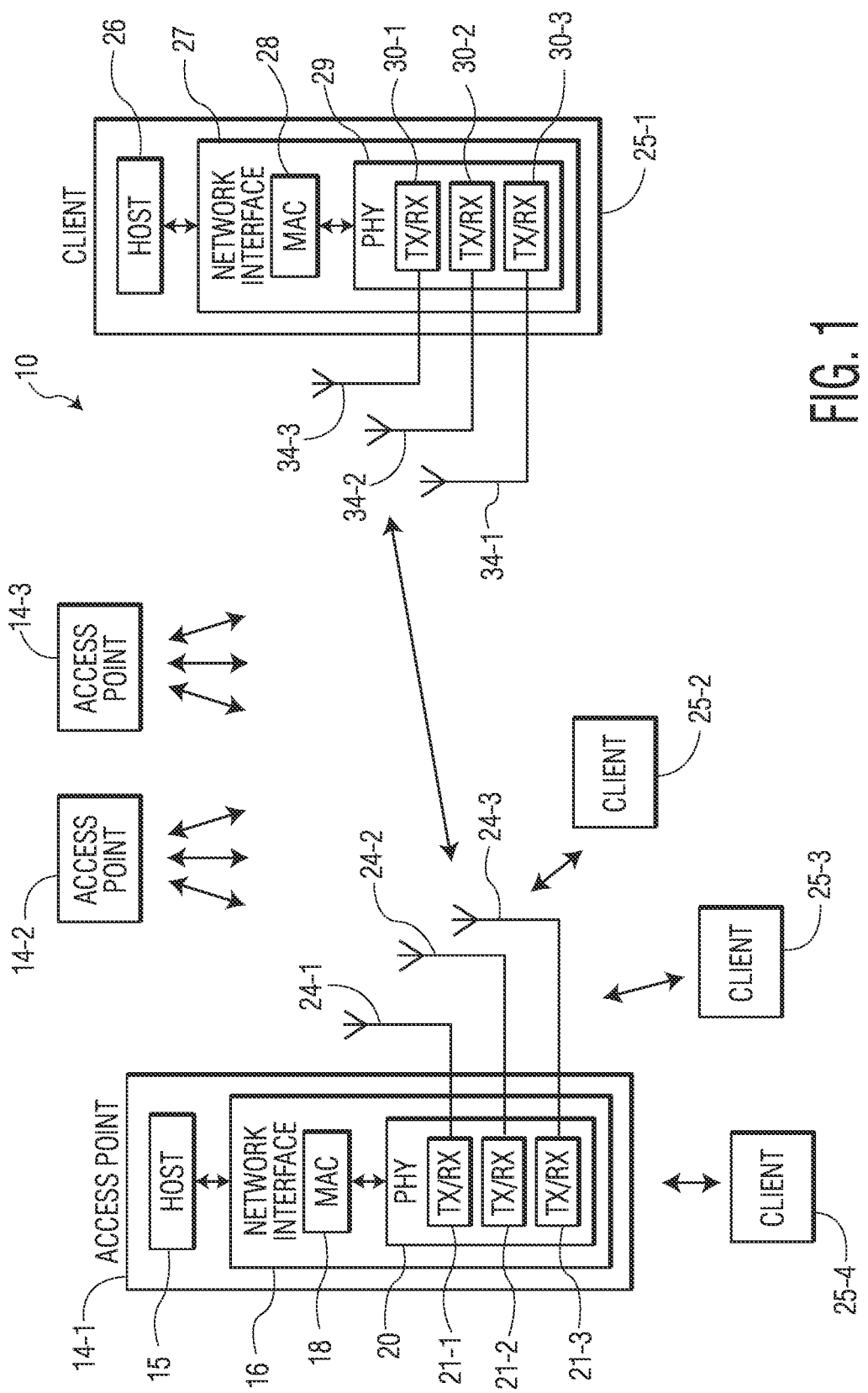
FIG. 1 is a block diagram of an example wireless local area network (WLAN), according to an embodiment.

FIG. 1 is a block diagram of an example wireless local area network (WLAN) 10, according to an embodiment. Such a WLAN 10 may need to be able to update operating parameters across a range of different versions of Wi-Fi or IEEE 802.11. An access point (AP) 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 may include different numbers (e.g., 1, 2, 4, 5, etc.) of transceivers 21 and antennas 24 in other embodiments. The WLAN 10 may include multiple APs 14-1, 14-2, 14-3 as shown, but any number of APs 14 may be included in WLAN 10.

The WLAN 10 includes a plurality of client stations (STA) 25. Although four client stations 25 are illustrated in FIG. 1, the WLAN 10 may include different numbers (e.g., 1, 2, 3, 5, 6, etc.) of client stations 25 in various scenarios and embodiments. The WLAN 10 may also include AP multi-link device (MLD) where one AP MLD includes multiple affiliated APs and client STA multi-link devices (MLD) where one STA MLD includes multiple affiliated STAs. Two or more of the STAs of an STA MLD 25 are configured to receive corresponding data streams that are transmitted simultaneously by the AP 14. Additionally, two or more of the STAs of an STA MLD 25 are configured to transmit corresponding data streams to one AP MLD 14 such that the AP MLD 14 simultaneously receives the data streams. Also, the client station MLD 25 are configured to receive data streams that are transmitted simultaneously by multiple APs of one AP MLD 14. Likewise, the STAs of an STA MLD 25 may transmit data streams simultaneously to the multiple APs of an AP MLD 14.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 may include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the APs 14 and the client stations 25 contend for communication medium using carrier sense multiple access with collision avoidance (CSMA/CA) protocol or another suitable medium access protocol. Further, in an embodiment, the APs 14 or a client station 25 dynamically selects a bandwidth for a transmission based on channels available for the transmission.

In an embodiment, the APs 14 are configured to simultaneously transmit different orthogonal frequency division multiplexing (OFDM) units to different client stations 25 by forming an OFDM access (OFDMA) data unit that includes the different OFDM data units modulated in respective sub-channel blocks of the OFDMA data unit. In an embodiment, the AP 14 allocates different sub-channels to different client stations and forms the OFDMA data unit that includes OFDM data units directed to by modulating the different client stations in sub-channel blocks corresponding to the sub-channels assigned to the client stations.

In an embodiment, the APs 14 are configured to simultaneously transmit different OFDM units to different client stations 25 by transmitting the different OFDM data units via different space time streams of a MU-MIMO communication channel. In an embodiment, the APs 14 allocates different sub-channels (i.e., space time streams) to different client stations and forms the OFDM data units and modulates the different OFDM data units to the space time streams corresponding to the sub-channels assigned to the client stations.

Various iterations of the 802.11 specification are referred to herein. IEEE 802.11ac is referred to as very high throughput (VHT). IEEE 802.11ax is referred to as high efficiency (HE). IEEE 802.11be is referred to as extreme high throughput (EHT). The terms VHT, HE, and EHT will be used in the descriptions found herein.

As described above an AP MLD operates on multiple links where each link has one AP affiliated with the AP MLD. This may be accomplished by having multiple different radios.

A STA MLD operates on one or multiple links where each link has one STA affiliated with the STA MLD. One way to implement the STA MLD is using two or more radios, where each radio is associated with a specific link. Another way to implement the STA MLD is using a single radio in two different bands. Each band may be associated with a specific link. In this case only one link is available at a time. In yet another implementation, an enhanced single-radio (ESR) STA MLD may be used. The ESR STA MLD uses two radios in different bands to implement the STA. For example, one radio may be a lower cost radio with lesser capabilities and the other radio may be a fully functional radio supporting the latest protocols. The ESR STA MLD may dynamically switch its working link while it can only transmit or receive through one link at any time. The ESR STA MLD may monitor two links simultaneously, for example, detecting medium idle/busy status of each link, or receiving a PHY Protocol Data Unit (PPDU) on each link. Each radio may have its own backoff time, and when the backoff counter for one of the radios becomes zero that radio and link may be used for transmission. For example, if an AP wants to use the fully functional radio, it may send a control frame that is long enough for the ESR STA MLD to switch from the lesser capable radio to the fully functional radio, that may then transmit data to the AP.

Unscheduled automatic power save delivery (U-APSD) is defined in current IEEE 802.11 for power save operation. STAs may use U-APSD to have some or all of their buffer units (BUs) delivered during unscheduled service periods (SPs). If there is no unscheduled SP in progress, the unscheduled SP begins when the AP receives a trigger frame from a STA, which is a quality of service (QoS) Data or QoS Null frame using an access category (AC) the STA has configured to be trigger-enabled. An aggregated MAC protocol data unit (A-MPDU) that contains one or more trigger frames acts as a trigger frame. An unscheduled SP ends after the AP has attempted to transmit at least one BU using a delivery-enabled AC and destined for the STA, but no more than the number indicated in the Max SP Length field of the QoS Capability element of the STA's (Re)Association Request frame, if the field has a nonzero value.

At every beacon interval, the AP shall assemble a partial virtual bitmap containing the buffer status per destination for STAs in the PS mode and shall send this out in the traffic indication map (TIM) element of the Beacon frame. At every beacon interval, the APSD-capable AP shall assemble the partial virtual bitmap containing the buffer status of nondelivery-enabled ACs (if there exists at least one nondelivery-enabled AC) per destination for STAs in PS mode, and the APSD-capable AP shall send this out in the TIM element of the Beacon frame. When all ACs are delivery-enabled, the APSD-capable AP shall assemble the partial virtual bitmap containing the buffer status for all ACs per destination.

When the STA detects that the bit corresponding to its AID is 1 in the TIM, the STA shall issue a PS-Poll frame or a trigger frame if the STA is using U-APSD and all ACs are delivery-enabled to retrieve the buffered BU. At each unscheduled SP for a STA, the AP shall attempt to transmit at least one BU, but no more than the value specified in the Max SP Length field in the QoS Capability element from delivery-enabled ACs, that are destined for the STA.

During the standardization of the IEEE 802.11be protocol, the following ideas has been discussed. A bit in a partial virtual bitmap of a traffic indication map (TIM) element (hereinafter TIM bit) that corresponds to a non-AP MLD is set to 1 if any individually addressed BUs for the non-AP MLD are buffered by the AP MLD. When a non-AP MLD makes a multi-link setup with an AP MLD, one association ID (AID) is assigned to the non-AP MLD across all links. Each STA of an MLD may independently select and manage its operational parameters unless specified otherwise in the IEE 802.11be standard.

Figure 2:
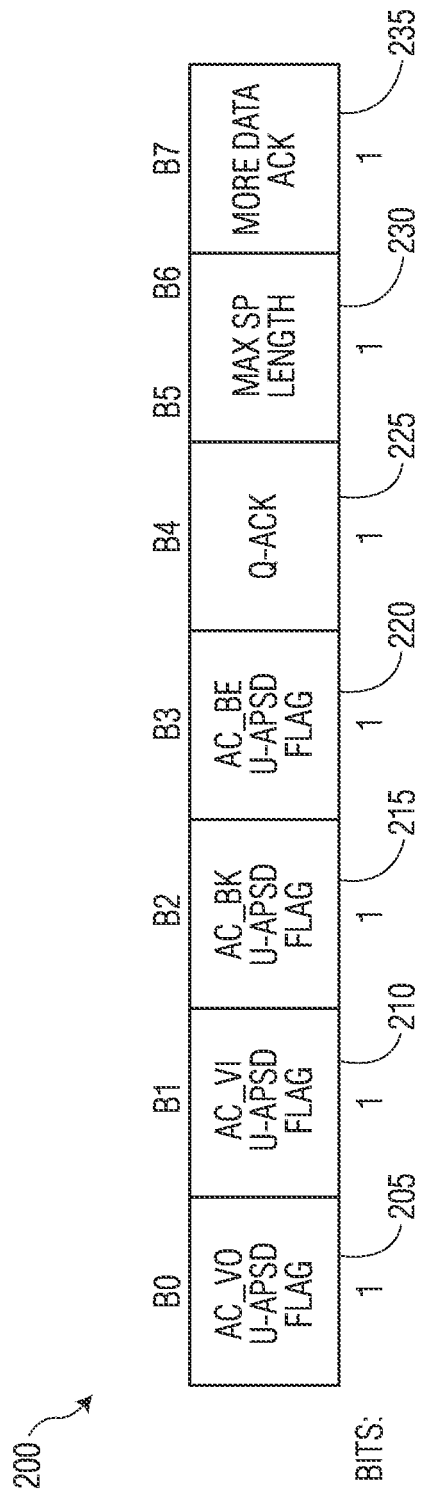
FIG. 2 illustrates the QoS info field.

The use of MLD devices raises issues with specifying QoS. The QoS capability element include a QoS info field. FIG. 2 illustrates the QoS info field 200. The QoS info field 200 includes four one bit AC flags: AC voice (AC_VO) 205, AC video (AC_VI) 210, AC background (AC_BK) 215, and AC best effort (AC_BE) 220. The QoS info field 200 further includes a one bit Q-Ack field 225, a two bit Max SP Length field 230, and a one bit More Data Ack field 235. This is the QoS Info field sent by a non-AP STA.

Each of the ACs U-APSD Flag subfields AC_VO 205, AC_VI 210, AC_BK 215, and AC_BI 22 is set to 1 in (Re)Association Request frames to indicate that the corresponding AC is both trigger-enabled and delivery-enabled. They are set to 0 in (Re)Association Request frames to indicate that the corresponding AC is neither trigger-enabled nor delivery-enabled. If a non-AP MLD's QoS capability on different link is set independently, it is possible that U-APSD flags for ACs on different links may be set in different ways.

A TIM bit corresponding to a non-AP MLD indicates buffered BU status for a non-AP MLD. However for each AC, if U-APSD flags are set differently for different links, the TIM indication may result in conflicting information.

An operation example will now be described showing such a conflict. A non-AP MLD operates on link 1 and link 2. On link 1, a first AC is set to delivery-enabled AC while some other ACs are set to nondelivery-enabled AC. On link 2, the first AC is set to a nondelivery-enabled AC. If a serving AP MLD has a buffered BU for the non-AP MLD, whose access category is the first AC: from the link 1 perspective, as the first AC is a delivery-enabled AC, the AP MLD is not supposed to set the TIM bit corresponding to the non-AP MLD to 1; however from the link 2 perspective, as the first AC is a nondelivery-enabled AC, the AP MLD is supposed to set the TIM bit corresponding to the non-AP MLD to 1. As there is only one TIM indication for the non-AP MLD, the AP cannot decide how to set the TIM bit for the non-AP MLD in this situation because different link requests require the setting of the TIM bit differently.

Various options for solving this problem will now be described.

In a first option, for a non-AP MLD, U-APSD related QoS capabilities shall be set to the same values across all links. More specifically, if a STA is affiliated with a non-AP MLD, the non-AP MLD shall have the same U-APSD Flag value for each AC across all setup links. For example, if a first AC is set to a trigger-enabled AC on a first link of the non-AP MLD, the first AC shall be set to a trigger-enabled AC on all other links of the non-AP MLD that a multi-link has set up with an AP MLD. If a first AC is set to a nontrigger-enabled AC on a first link of the non-AP MLD, the first AC shall be set to a nontrigger-enabled AC on all other links of the non-AP MLD that a multi-link is set up with an AP MLD. If a first AC is set to a delivery-enabled AC on a first link of the non-AP MLD, the first AC shall be set to a delivery-enabled AC on all other links of the non-AP MLD that a multi-link is set up with an AP MLD. If a first AC is set to a nondelivery-enabled AC on a first link of the non-AP MLD, the first AC shall be set to a nondelivery-enabled AC on all other links of the non-AP MLD that a multi-link is set up with an AP MLD.

When the non-AP MLD transmits a first frame including one or more QoS capability elements, wherein the one or more QoS capability elements indicates the non-AP MLD's QoS capability on multiple links that the non-AP MLD supports, the following subfields of the QoS capability element for different links may be set to the same value across all the multiple links:
    AC_VO U-APSD Flag;
    AC_VI U-APSD Flag;
    AC_BK U-APSD Flag;
    AC_BE U-APSD Flag;
    (Max SP Length); and
    (More Data Ack).

In one embodiment, the first frame is an Association Request frame and/or Reassociation Request frame. In another embodiment, the QoS capability elements for different link transmitted by the non-AP MLD shall have the same value across all the multiple links.

When the non-AP MLD transmits an add traffic stream (ADDTS) Request frame for an AC to the AP MLD, the APSD subfield and the Schedule subfield value for different link shall be set to the same value. In one embodiment, a single APSD subfield indicates the APSD status for all links and a single Schedule subfield indicates the scheduling status for all links of the non-AP MLD. In another embodiment, a single APSD/Schedule subfields indicates the APSD/scheduling status for one link and the APSD subfields of all different links are set to the same value.

In another embodiment, a TS (Traffic Stream) is set up per non-AP MLD. The same TS parameters are applied to all links that the non-AP MLD made during the multi-link setup with the AP MLD. The same traffic classification (TCLAS)/ traffic specification (TSPEC) are applied to all links that the non-AP MLD made during the multi-link setup with the AP MLD.

In a second option, an AP MLD sets a TIM bit corresponding to a non-AP STA to 1 if conditions for setting the TIM bit to 1 on any link for the non-AP STA are satisfied. The TIM bit is set to 1 if the following conditions for a link are met on any link within a set of links that multi-link has setup for the non-AP STA: the AP MLD has buffered BU of nondelivery-enabled ACs for the non-AP MLD if there exists at least one nondelivery-enabled AC on the link; and the AP MLD has buffered BU for the non-AP MLD when all ACs are delivery-enabled. For each link within the set of links, each AC can be categorized as either a delivery-enabled AC or a nondelivery-enabled AC independently.

In a third option, an AP MLD sets a TIM bit corresponding to a non-AP STA to 1 if conditions for setting the TIM bit to 1 on all links for the non-AP STA are satisfied. The TIM bit is set to 1 if the following conditions for a link are met on all links within a set of links that multi-link has setup for the non-AP STA: the AP MLD has buffered BU of nondelivery-enabled ACs for the non-AP MLD if there exists at least one nondelivery-enabled AC on the link; and the AP MLD has buffered BU for the non-AP MLD when all ACs are delivery-enabled. For each link within the set of links, each AC can be categorized as either a delivery-enabled AC or a nondelivery-enabled AC independently.

Issues that arise with the listen interval during multi-link operation will now be described. The Listen Interval field is used to indicate to the AP how often a non sub 1 GHz (non-S1G) STA in power save mode wakes to listen to Beacon frames. An AP may delete buffered BUs for implementation dependent reasons, including the use of an aging function and availability of buffers. The AP may base the aging function on the listen interval indicated by the STA in its (Re)Association Request frame or the wireless network monitoring (WNM) sleep interval specified by the non-AP STA in the WNM Sleep Mode Request frame. Also, the WNM Sleep Interval field indicates to the AP how often a STA in WNM sleep mode wakes to receive Beacon frames, defined as the number of delivery traffic indication map (DTIM) intervals. STAs in WNM sleep mode can wake up as infrequently as once every WNM sleep interval to check whether the corresponding TIM bit is set or group addressed traffic is pending. However, for a non-AP MLD that multi-link is setup with an AP MLD, as the non-AP MLD's PS-Poll/Trigger frame transmission can happen on any of setup links, it is possible that the non-AP MLD triggers the buffered BU transmission on other links before the listen interval on a link expires.

Various solutions regarding the use of a listen interval during multi-link operation will now be described.

In a first solution, a non-AP MLD maintains one listen interval value across all links that multi-link is setup with an AP MLD; or, a non-AP MLD maintains one listen interval value for a TID (or AC) across all links to which the TID (or AC) is mapped.

More specifically, when a (re)association is for a multi-link (re)setup, the Listen Interval field is used to indicate to the AP MLD how often at least a STA affiliated with a non-AP MLD wakes to listen to Beacon frames if all STAs affiliated with the non-AP MLD and associated with the multi-link (re)setup are in power save mode. An AP MLD uses the listen interval in determining the lifetime of frames that it buffers for a non-AP MLD. Any AP MLD aging function shall not cause the buffered BU to be discarded after any period that is shorter than that indicated by the non-AP MLD for which the BUs are buffered in the Listen Interval field of its (Re)Association Request frame. If all STAs operating on enabled links and affiliated with the non-AP MLD that is associated with the multi-link (re)setup are in power save mode, at least one of these STAs shall wake up to receive at least one Beacon frame scheduled for transmission within the interval of duration equal to the listen interval indicated by the non-AP MLD in its (Re) Association Request frame, starting from the last TBTT for which another STA or the same STA affiliated with the MLD was awake.

The following variations may be implemented as well.

When a non-AP MLD transmits a frame that includes one or more Listen Interval fields for a traffic ID (TID) (or AC), the one or more Listen Interval field(s) indicates to the AP MLD how often the non-AP MLD in power save mode wakes to listen to Beacon frames.

The frame may be an Association Request frame and/or Reassociation Request frame.

The frame may include only one Listen Interval field, and the Listen Interval field indicates how often the non-AP MLD in power save mode wakes to listen to Beacon frames.

The Beacon frames may be Beacon frames on any active link that the non-AP MLD made a multi-link setup with an AP MLD.

The frame includes more than one Listen Interval field, and the minimum value of the more than one Listen Interval fields indicates how often the non-AP MLD in power save mode wakes to listen to Beacon frames.

The frame includes more than one Listen Interval field, and the maximum value of the more than one Listen Interval fields indicates how often the non-AP MLD in power save mode wakes to listen to Beacon frames.

The value of the Listen Interval field is in units of a reference beacon interval. In one variation, beacon intervals of all links are the same. In another variation, In the reference beacon interval is the beacon interval of a link that the frame is transmitted. In another variation, each of the more than one Listen Interval corresponds to each link within a set of links that multi-link is setup with the AP MLD, and the reference beacon interval for each Listen Interval field for a link is the beacon interval of the link.

In a second solution that is similar to the first solution, a non-AP MLD indicates a listen interval value of one or more links to an AP MLD, and when the non-AP MLD is in power save mode on the one or more links, the non-AP MLD listens to Beacon frames of the AP MLD of any link that indicates the information of the one or more links at least once in the listen interval value.

In a third solution for implementing a Listen interval, a non-AP MLD maintains one WNM sleep interval value across all links that multi-link is setup with an AP MLD. More specifically, the WNM sleep interval advertised by a STA of a non-AP MLD is applied at the MLD level and the WNM procedures are performed at the MLD level and apply to all the STAs affiliated with the MLD. All STAs affiliated with an MLD shall advertise the same WNM Sleep Mode capability. The WNM sleep state is maintained at the MLD level and WNM sleep mode procedures are performed at the MLD level and apply to all the STAs affiliated with the MLD. The AP MLD may delete buffered BUs for the implementation dependent reasons, including the use of an aging function and availability of buffers where the aging function is based on the listen interval indicated by the non-AP MLD in its (Re)Association Request frame or the WNM sleep interval specified by the non-AP MLD in the WNM Sleep Mode Request frame.

For example, when a non-AP MLD transmits a frame that includes one or more WNM Sleep Interval subfields, the one or more WNM Sleep Interval subfields indicates to the AP MLD how often the non-AP MLD in WNM sleep mode wakes to receive Beacon frames.

In one variation, the frame is a (possibly modified version of) WNM Sleep Mode Request frame.

In another variation, the Beacon frames may be Beacon frames on any active link that the non-AP MLD made a multi-link setup with an AP MLD.

In another variation, the frame includes only one Listen Interval field, and the Listen Interval field indicates how often the non-AP MLD in WNM sleep mode wakes to listen to Beacon frames.

In another variation, the frame includes more than one WNM Sleep Interval subfield, and the minimum value of the more than one WNM Sleep Interval subfields indicates how often the non-AP MLD in WNM sleep mode wakes to listen to Beacon frames.

In another variation, the frame includes more than one WNM Sleep Interval subfield, and the maximum value of the more than one WNM Sleep Interval subfields indicates how often the non-AP MLD in WNM sleep mode wakes to listen to Beacon frames.

In another variation, the value of the WNM Sleep Interval subfield is in units of a reference DTIM interval. The DTIM intervals of all links may be the same; the reference DTIM interval is the DTIM interval of a link that the frame is transmitted; or each of the more than one WNM Sleep Interval corresponds to each link within a set of links that multi-link is setup with the AP MLD, and the reference DTIM interval for each WNM Sleep Interval subfield for a link is the DTIM interval of the link.

In another variation, the non-AP MLD is in WNM sleep mode on one or more links, the non-AP MLD checks whether the corresponding TIM bit is set or group addressed traffic is pending from the AP MLD at intervals not longer than the WNM sleep interval value.

During the standardization of IEEE 802.11be, multi-link device (MLD) with different capabilities were defined:

single link/radio non-AP MLD: a non-AP MLD that supports operation on more than one link but receives or transmits frames only on one link at a time;

nonsimultaneous transmit and receive (NSTR) link pair (NSTR MLD): a pair of links for which a STA of an MLD has indicated an nonsimultaneous transmit and receive relationship as defined in 35.3.12.3 of IEEE 802.11be (Nonsimultaneous. Each link of such a pair is a member of the NSTR link pair);

enhanced multi-link single radio (eMLSR) operation: as defined in 35.3.13 of IEEE 802.11be_D0.1 standard; and enhanced multi-link multi radio (eMLMR) operation As defined in 35.3.14 of IEEE 802.11be_D0.1 standard.

Issues related to implementing Power Save operation for an NSTR MLD will now be described. If an AP MLD has a buffered BU for a non-AP MLD that is an NSTR MLD on a pair of links, a corresponding bit in a virtual bitmap of a TIM element in a Beacon frame on a link from the AP MLD is set to 1. When the non-AP MLD identifies that the corresponding bit is equal to 1 in the virtual bitmap of the TIM element, STAs on one or more links (within the pair of links) are supposed to send a PS-Poll frame or a U-APSD trigger frame to the serving AP(s) to indicate that the one or more STAs are awake and ready to receive the buffered BU. However, because of the NSTR property of the non-AP MLD, it is hard for the non-AP MLD to send the PS-Poll or the U-APSD trigger frame on multiple links.

Figure 3:
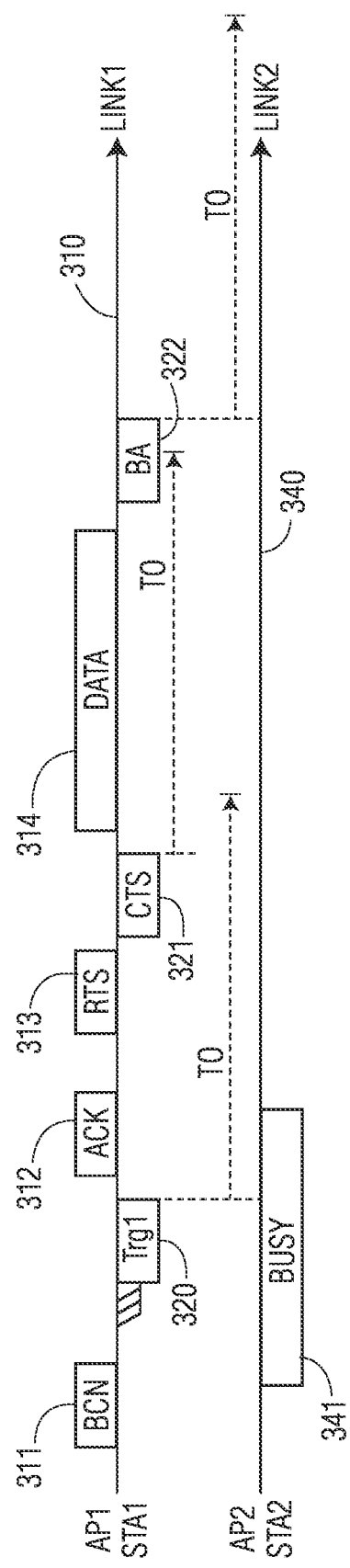
FIG. 3 illustrates an operation example of the issue with power save mode using MLDs.

FIG. 3 illustrates an operation example of the issue with power save mode using MLDs. A first link (link 1) 310 is set up between AP1 of a MLD AP and STA1 of a MLD STA. Likewise, a second link (link 2) 340 is set up between AP2 of the MLD AP and STA2 of the MLD STA. The non-AP MLD (STA1 on link 1 310 and STA2 on link 2 340) is an NSTR MLD on link 1 310 and link 2 340. The AP MLD (AP1 on link 1 310 and AP2 on link 2 340) indicates in a Beacon frame 311 on link 1 310 that the AP MLD has buffered BUs for the non-AP MLD. The non-AP MLD intends to transmit trigger frame 320 on both link 1 310 and link 2 340. On link 1 310, the channel is idle and backoff ends. However on link 2 340, the channel is busy 341. The non-AP MLD transmits trigger frame Trg1 320 on link 1 310 first. AP1 then sends an acknowledge (ACK) frame 312 followed by a request to send (RTS) frame 313. In response, STA1 send a clear to send (CTS) frame 321. Due to the transmission of a frame Trg1 320 on link 1 310, link 2 340 becomes blind. Therefore, the non-AP MLD holds off transmission on link 2 340 for a predetermined time (T0). Before the non-AP MLD transmits a trigger frame on link 2 340, the AP MLD transmits DL frame 314 on link 1 310 only. Due to the Tx/Rx on link 1 310, link 2 340 becomes blind again, and thus, the non-AP MLD cannot transmit the trigger frame until the end of the DL frame exchange which ends when STA1 sends a block acknowledge frame (BA) 322. Therefore, the non-AP MLD can only use link 1 310 for the DL frame exchange.

This operation example illustrates the issues that arise from an AP MLD perspective. When the AP MLD receives a trigger frame on a link from a non-AP MLD that is an NSTR MLD, several different operation scenarios are possible for the non-AP MLD.

In a first scenario, the non-AP MLD intends to wake up on the link only, and the non-AP MLD stays in Doze state on the other link. In this case, the AP MLD should transmit DL frames on the link only. In a second scenario, the non-AP MLD intends to wake up on both links. However, the backoff counter becomes zero on only on the one link, and the backoff counter takes more time to expire on the other link. In this case, the AP MLD should wait further for the trigger frame on the other link. As the AP MLD cannot identify which scenario the non-AP MLD is in, it is not clear how the AP MLD should operate when the AP MLD receives a trigger frame only on one link from the non-AP MLD.

Four different solutions to overcome these issues will now be described.

In a first solution, when a non-AP MLD that is an NSTR MLD intends to transmit a trigger frame on more than one link, the start time of the trigger frame transmission on more than one link is aligned. This first solution may include the following different variations:

when an AP MLD receives a trigger frame on one link from the non-AP MLD, the AP MLD considers that the non-AP MLD intends to be in Awake state on one link only;

when an AP MLD receives a trigger frame on a set of links from the non-AP MLD simultaneously, the AP MLD considers that the non-AP MLD intends to be in Awake state on the set of links;

when an AP MLD receives a trigger frame on one link from the non-AP MLD, the AP MLD initiates a DL frame transmission to the non-AP MLD without waiting for the reception of the trigger frame on other link(s) from the non-AP MLD; or when the non-AP MLD intends to transmit the trigger frame on more than one link, any kind of backoff mechanisms that enables for the non-AP MLD to align the start time of the trigger frame transmission can be used.

Figure 4:
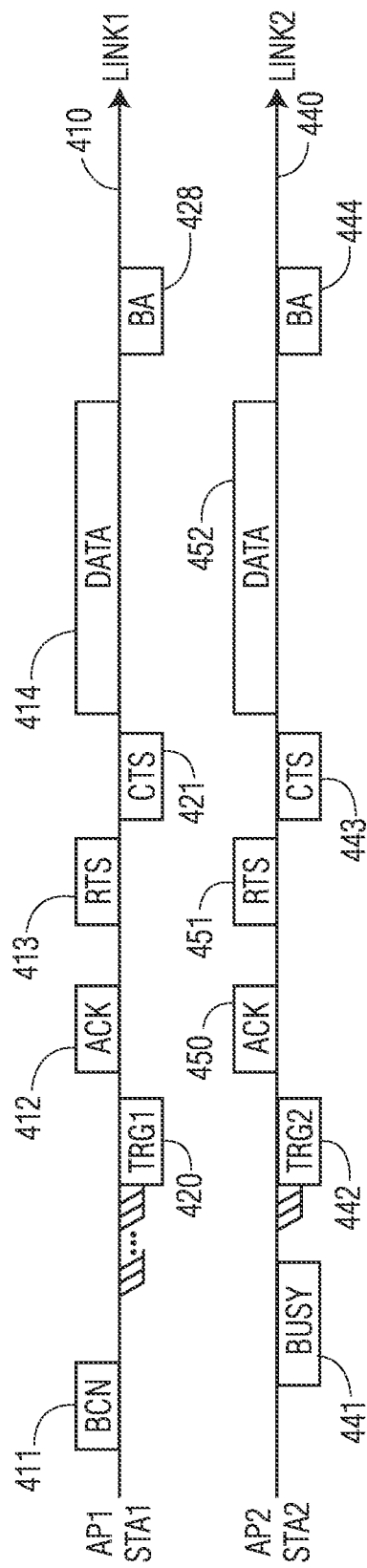
FIGS. 4 and 5 illustrate two different operational examples of the first solution of Tx time alignment for the trigger frame.
Figure 5:
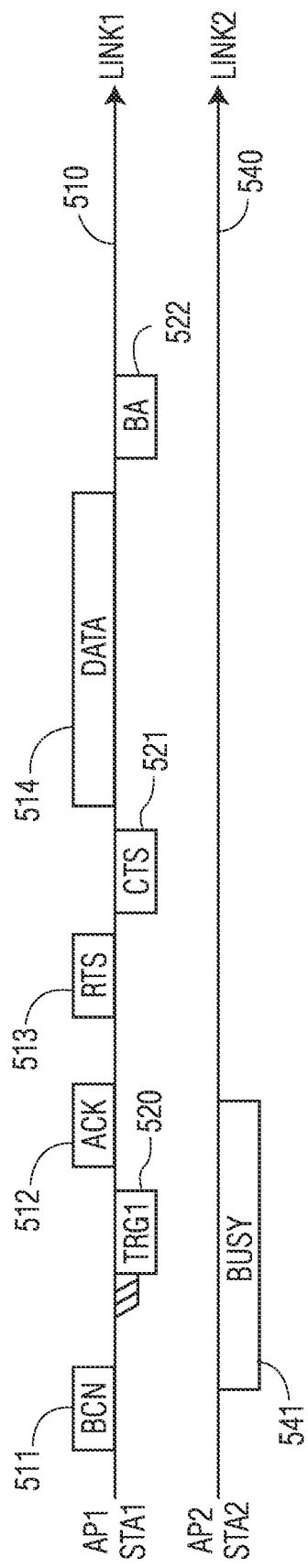

FIGS. 4 and 5 illustrate two different operational examples of the first solution of Tx time alignment for the trigger frame. In FIGS. 4 and 5 similar numbers are used to describe similar elements as those found in FIG. 3. A non-AP MLD (STA1 on link 1 410 or 510 and STA2 on link 2 440 or 540) is an NSTR MLD on link 1 410 or 510 and link 2 440 or 540. AP MLD (AP1 on link 1 410 or 510 and AP2 on link 2 440 or 540) indicates in a Beacon frame 411 or 511 on link 1 410 or 510 that the AP MLD has buffered BU for the non-AP MLD.

In FIG. 4, link 2 440 of NSTR MLD is busy at the beginning, and the NSTR MLD waits until the backoff counter values of both link 1 410 and link 2 440 become zero before transmitting trigger frame 420 and 442 on both link 1 410 and link 2 440. Each link then goes through the ACK, RTS, CTS, DATA, and BA frame sequence as described with respect to FIG. 3. As a result, DL transmission occurs on both link 1 410 and link 2 440.

In FIG. 5, link 2 540 of NSTR MLD is busy at the beginning, and the NSTR MLD decides to transmit the trigger frame 520 on link 1 510 only as shown in FIG. 3. Thus, DL transmission happens on link 1 510 only.

In a second solution, when a non-AP MLD that is an NSTR MLD transmits a trigger frame on a link, the trigger frame indicates if the non-AP MLD is in Awake state or not on the other link(s) among a set of links (e.g., the NSTR link pair). This second solution may include the following different variations:

when an AP MLD receives a trigger frame on the link from the non-AP MLD, wherein the trigger frame indicates that there is no other link switched to the Awake state, the AP MLD considers that the non-AP MLD intends to be in the Awake state on the link only;

when an AP MLD receives a trigger frame on the link from the non-AP MLD, wherein the trigger frame indicates that there is no other link switched to the Awake state, the AP MLD initiates a DL frame transmission sequence on the link without further waiting for trigger frame reception on other link(s) from the non-AP MLD;

when an AP MLD receives a trigger frame on the link from the non-AP MLD, wherein the trigger frame indicates that the non-AP MLD switched to the Awake state on other link(s), the AP MLD initiates a DL frame transmission sequence on multiple links; and when an AP MLD receives a trigger frame on the link from the non-AP MLD, wherein the trigger frame indicates if the non-AP MLD is not in the Awake state on other link(s), the AP MLD initiates a DL frame transmission sequence on the link only without further waiting for trigger frame reception on other link(s) from the non-AP MLD.

The indication if the non-AP MLD is in the Awake state or not on the other link(s) among a set of links is included in a MAC header part of the trigger frame. In one embodiment, the indication is a link bitmap, wherein each different bit in the link bitmap indicates if a link corresponding to the bit is in the Awake state or not. In another embodiment, the size of the indication is one bit, and the indication is set to a state (e.g., "1") if the non-AP MLD is in the Awake state on the other link within a NSTR link pair.

In a third solution, when an AP MLD receives a trigger frame on a link from a non-AP MLD that is an NSTR MLD, the AP MLD waits for a predetermined time before initiating DL frame transmission sequence to the non-AP MLD so that the non-AP MLD can transmit another trigger frame on another link(s) before the DL frame transmission sequence. This third solution may include the following different variations:

the predetermined time is defined by the standard;

the predetermined time is a value that the non-AP MLD indicates to the AP MLD as the non-AP MLD's capability when the non-AP MLD associates with the AP MLD;

the predetermined time is determined based on the negotiation between the non-AP MLD and the AP MLD;

the predetermined time is a value that the AP MLD indicates as the AP MLD's capability;

the predetermined time starts from the time that the AP MLD receives the trigger frame;

the predetermined time starts from the time that the AP MLD sends back an acknowledgement frame to the trigger frame;

the predetermined time starts from the time that the AP MLD receives the first trigger frame from the non-AP MLD when the non-AP MLD is in the Doze state on all NSTR links; and the trigger frame further includes an indication that the AP MLD can initiate the DL frame transmission sequence without waiting for the predetermined time.

Figure 6:
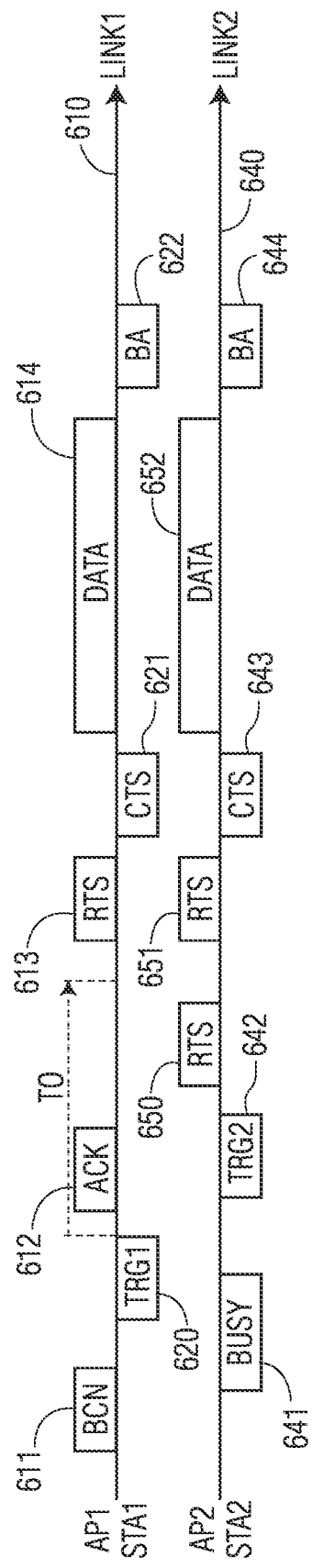
FIGS. 6 and 7 illustrate two different operational examples of the third solution of the AP MLD waiting a predetermined period of time.
Figure 7:
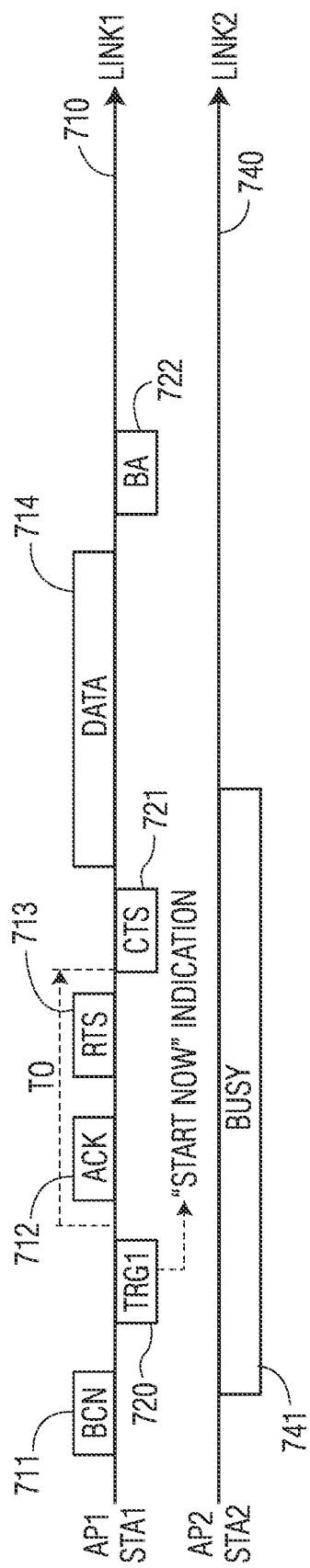

FIGS. 6 and 7 illustrate two different operational examples of the third solution of the AP MLD waiting a predetermined period of time. In FIGS. 6 and 7 similar numbers are used to describe similar elements as those found in FIGS. 3, 4, and 5. A non-AP MLD (STA1 on link 1 610 or 710 and STA2 on link 2 640 or 740) is an NSTR MLD on link 1 610 or 710 and link 2 640 or 740. The AP MLD (AP1 on link 1 610 or 710 and AP2 on link 2 640 or 740) indicates in a Beacon frame 611 or 711 on link 1 610 or 710 that the AP MLD has buffered BU for the non-AP MLD.

In FIG. 6, both STA1 and STA2 sends trigger frame 620 and 642 during the predetermined time (T0). Each link then goes through the ACK, RTS, CTS, DATA, and BA frame sequence as described with respect to FIGS. 3 and 4. As a result, DL transmission occurs on both link 1 610 and link 2 640.

In FIG. 7, STA1 indicates that the AP MLD can initiates DL Tx without waiting for T0 ("Start now" indication). Thus, DL transmission happens on link 1 510 only.

In a fourth solution, when a link of a non-AP MLD that is an NSTR MLD becomes blind due to the non-AP MLD's transmission on another link, the non-AP MLD starts a first timer at the end of the non-AP MLD's transmission on the other link, and the non-AP MLD can transmit a trigger frame while the first timer is running. This fourth solution may include the following different variations:

if during a transmission of a STA (STA1) of a non-STR non-AP MLD, another STA (STA2) of the same MLD cannot detect its medium state when required (due to STA1's UL transmission interference), STA2 shall start a MediumSyncDelay timer at the end of STA1's transmission, unless the STA2 ended a transmission at the same time:

the MediumSyncDelay timer expires after a duration value that is either assigned by AP or specified in spec or if at least either of the following events happens: any received PPDU with a valid MPDU; or a received PPDU with a valid TxOP_duration, whichever happens first;

while the MediumSyncDelay timer is running the STA is only allowed to attempt to initiate up to number of transmit opportunities (TxOPs) assigned by the AP (at least 1) or trigger frame transmission and shall attempt to initiate that TxOP with the transmission of an RTS frame using regular EDCA backoff using baseline CCA but a TBD ED threshold value; the TBD ED threshold value has a default value specified in the spec (e.g., −62 dBm) but can also be assigned by the AP MLD within a limited range such as between −82 dBm and −62 dBm;

the format of the trigger frame that is allowed to transmit while the first timer is running is QoS Null frame;

the format of the trigger frame that is allowed to transmit while the first timer is running is PS-Poll frame;

the length of the trigger frame that is allowed to transmit while the first timer is running is less than or equal to a first value; in one embodiment, the first value is either assigned by the AP MLD or specified in the standard; in another embodiment, the length of the trigger frame is the size of the payload of the frame; and in another embodiment, the length of the trigger frame is the duration of a PPDU that carries the trigger frame;

the non-AP MLD's transmission on the other link is a transmission of a trigger frame;

while the first timer is running, the number of trigger frame transmission is less than a second value; in one embodiment, the second value is either assigned by the AP MLD or specified in the standard; and when an AP MLD receives a trigger frame on the link from the non-AP MLD, the AP MLD waits for a predetermined time before initiating DL frame transmission sequence to the non-AP MLD so that the non-AP MLD can transmit another trigger frame on the other link before the DL frame transmission sequence.

Figure 8:
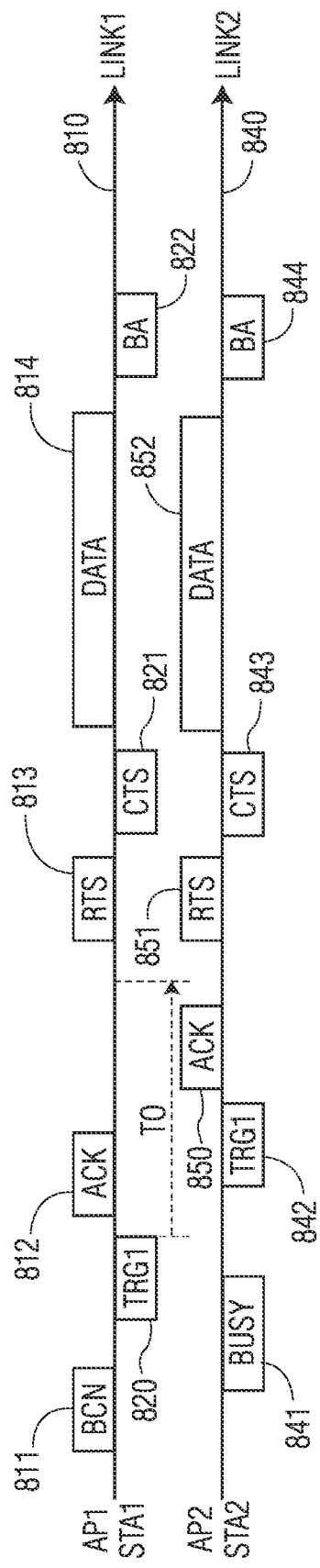
FIG. 8 illustrates an operational example of the fourth solution of the trigger frame being allowed during MediumSyncDelay.

FIG. 8 illustrates an operational example of the fourth solution of the trigger frame being allowed during MediumSyncDelay. In FIG. 8 similar numbers are used to describe similar elements as those found in FIGS. 3, 4, 5, 6, and 7. A non-AP MLD (STA1 on link 1 810 and STA2 on link 2 840) is an NSTR MLD on link 1 810 and link 2 840. The AP MLD (AP1 on link 1 810 and AP2 on link 2 840) indicates in a Beacon frame 811 on link 1 810 that the AP MLD has buffered BU for the non-AP MLD. After STA1 transmits a trigger frame Trg1 820, MediumSyncDelay (T0) starts on link 2 840. Then STA2 transmits a trigger frame Trg2 842 on link 2 840 while T0 timer is running. Each link then goes through the ACK, RTS, CTS, DATA, and BA frame sequence as described with respect to FIGS. 3 and 4. As a result, DL transmission occurs on both link 1 810 and link 2 840.

MLDs in eMLMR operation may face the similar problems as NSTR MLD operation. If an AP MLD has a buffered BU for a non-AP MLD that is in eMLMR operation on a set of links, a corresponding bit in a virtual bitmap of a TIM element in a Beacon frame on a link from the AP MLD is set to 1. When the non-AP MLD identifies that the corresponding bit is equal to 1 in the virtual bitmap of the TIM element, STAs on one or more links (within the set of links) are supposed to send a trigger frame to the serving AP(s) to indicate that the one or more STAs are awake and ready to receive the buffered BU. However, if the AP MLD transmits a frame that initiates a DL frame exchange to the non-AP MLD when the AP MLD receives a trigger frame from the non-AP MLD on one link among the set of links before the non-AP MLD transmits the trigger frame on other link among the set of links, the AP MLD cannot choose the better link for DL transmission among the set of links.

The same solutions discussed above may be applied for eMLMR operation as well. In the first solutions, when a non-AP MLD operating in eMLMR mode intends to transmit a trigger frame on more than one link, the start time of the trigger frame transmission on more than one link is aligned. In the second solution, when a non-AP MLD operating in eMLMR mode transmits a trigger frame on a link, the trigger frame indicates if the non-AP MLD is in Awake state or not on the other link(s) among a set of links. In a third solution, when an AP MLD receives a trigger frame on a link from a non-AP MLD operating in eMLMR mode, the AP MLD waits for a predetermined time before initiating DL frame transmission sequence to the non-AP MLD so that the non-AP MLD can transmit another trigger frame on another link(s) before the DL frame transmission sequence. In the fourth solution, when a link of a non-AP MLD operating in eMLMR mode becomes blind due to the non-AP MLD's transmission on another link, the non-AP MLD starts a first timer at the end of the non-AP MLD's transmission on the other link, and the non-AP MLD may transmit a trigger frame while the first timer is running.

Also, further embodiments described in the solutions discussed above may be applied to eMLMR operation.

During the standardization of EHT WLAN protocol in IEEE 802.11be, the concept of single radio (SR) MLD has been introduced. A multi radio (MR) MLD is a MLD that has more than one radios such that the MLD can transmit frames on more than on link at a time and receive frames on more than one link at a time. An SR non-AP MLD is an MLD that transmits or receives frames on a single link to another MLD at a time. An enhanced SR (ESR) non-AP MLD is an MLD that transmits or receives (data/management) frames to another MLD on one link, and listens/monitors on one or more links.

As an SR MLD can only transmit and receive on one link at a time. i.e., active mode is possible on one link only, current power save operation causes problems such as: if the SR MLD is in active mode for more than one link, and if an AP MLD has a frame to transmit to the SR MLD, the AP MLD does not know which link the SR MLD can receive the frame. Therefore, embodiments will be described that define mechanisms so that the AP MLD may identify on which link the SR MLD is ready to receive a DL frame.

Three solutions to address the issue that only one link is in the active mode will be described.

In a first solution, if an SR MLD is in Active mode on one link, the SR MLD shall be in Power Save (PS) mode on other link. Further variations of this solution may include the following:

an SR MLD shall not be in Active mode on more than one link;

if the SR MLD is in Active mode on one link, the state of the PS mode on other link is the Doze state;

if the SR MLD sends a frame with Power Management (PM) subfield set to 0 and receives an acknowledgement frame for the frame on one link, the SR MLD shall be in PS mode on other link and the state of the PS mode on the other link is the Doze state;

if the SR MLD is not in the Doze state before sending the frame on the other link, the SR MLD's state is changed to the Doze state when the SR MLD receives the acknowledgement frame;

if the SR MLD sends a frame with Power Management (PM) subfield set to 0 on one link, the SR MLD shall be in PS mode on other link and the state of the PS mode on the other link is the Doze state; and if the SR MLD is not in the Doze state before sending the frame on the other link, the SR MLD's state is changed to the Doze state when the SR MLD transmits the frame.

Figure 9:
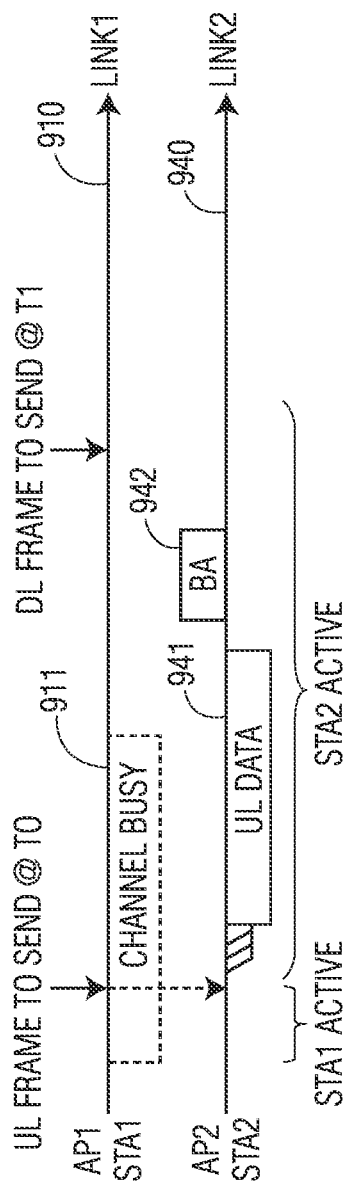
FIG. 9 illustrates an operation example of upload (UL) TX.

When an SR MLD is in Active mode on one link but the SR MLD transmits a frame on the other link, it is not clear for an AP MLD which link the SR MLD can receive DL frames. FIG. 9 illustrates an operation example of upload (UL) TX. An SR MLD is in Active mode on link 1 910 (STA1 in Active mode) and in a PS mode the Doze state on link 2 940 (STA2 in PS Doze mode). When the SR MLD monitors link 1 910 for UL transmission at T0, the link is busy 911. The SR MLD switches its link to link 2 940 (STA2 in Active mode and STA1 in PS Doze mode) and initiates UL transmission 941 on link 2 940. AP2 sends a BA frame 942 in response to the UL transmission 941. After finishing the UL transmission 941, the SR MLD may stay on link 2 1040. However, the AP MLD still considers that the SR MLD is in the Active mode on link 1 910 and in the PS mode Doze state on link 2 940. Therefore, when there is a DL frame to transmit at T1, the AP MLD will transmit DL frame on link 1 910 while the SR MLD is active on link 2 940.

In a second solution for addressing UL TX, if an SR MLD has a successful UL transmission on one link, the SR MLD shall be in the PS Doze state on other link. Further variations of this second solution include:

a successful UL transmission implies that an acknowledgement frame is received from the serving AP MLD for the UL transmission;

if the SR MLD initiates a UL TXOP, the SR MLD shall be in the PS Doze state on the other link;

if the SR MLD transmits a frame that initiates a UL TXOP and receives an acknowledgement frame for the frame, the SR MLD shall be in the PS Doze state on the other link;

if the SR MLD's UL TXOP on the link ends, the SR MLD shall be in the PS Doze state on the other link;

when the SR MLD transmits a frame that initiates a UL TXOP and receives an acknowledgement frame for the frame, if the SR MLD is not in the PS Doze state on the other link (such as Active mode, PS Awake state, etc.), the SR MLD switches to PS Doze state on the other link.

A third solution includes the following variations:

if an SR MLD is in Active mode on a link, the SR MLD shall not transmit a UL frame on the other link;

if an SR MLD is in Awake mode on a link, the SR MLD shall not transmit a UL frame on the other link;

if an SR MLD is in Active mode on a link, the SR MLD shall transmit a UL frame on the link only;

if an SR MLD is in Awake mode on a link, the SR MLD shall transmit a UL frame on the link only;

if an SR MLD is in Active mode on a link and the SR MLD intends to switch an operating link to the other link, the SR MLD shall transition to PS mode on the link first before switching the operating link to the other link; and if an SR MLD is in Active mode on a link and the SR MLD intends to transmit a UL frame on the other link, the SR MLD shall transition to the PS mode on the link first before transmitting the UL frame on the other link.

Figure 10:
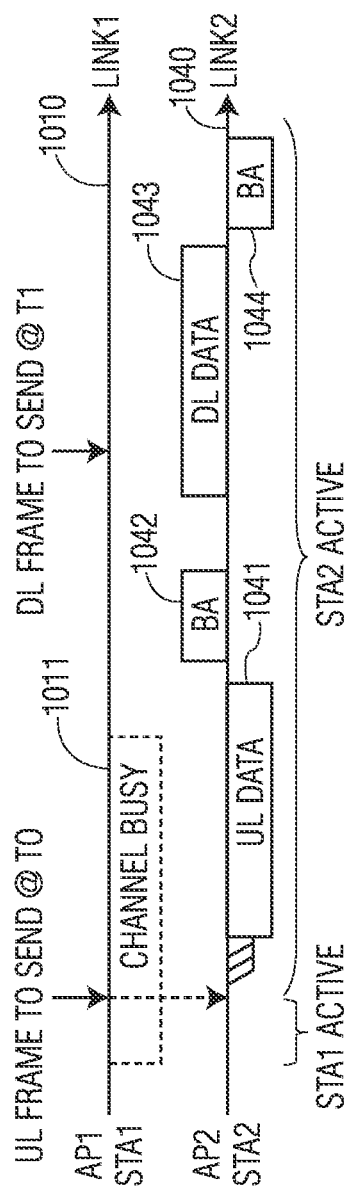
FIG. 10 illustrates another operation example of UL TX.

FIG. 10 illustrates another operation example of UL TX. An SR MLD is in Active mode on link 1 1010 (STA1 in Active mode) and in a PS mode Doze state on link 2 1040 (STA2 in PS Doze mode). When the SR MLD monitors link 1 1010 for UL transmission at T0, the link is busy 1011. The SR MLD switches its link to link 2 1040 (STA2 in Active mode and STA1 in PS Doze mode) and initiates UL transmission 1041 on link 2 1040. AP2 sends a BA frame 1042 in response to the UL transmission 1041. When a serving AP MLD receives a UL frame 1041 on link 2 1040, the AP MLD identifies that the SR MLD's operating link is switched to link 2. When the AP MLD has DL frames 1043 to send at T1, the AP MLD transmits the DL frame 1043 on link 2 1040. The STA2 then responds with a BA frame 1044

Figure 11:
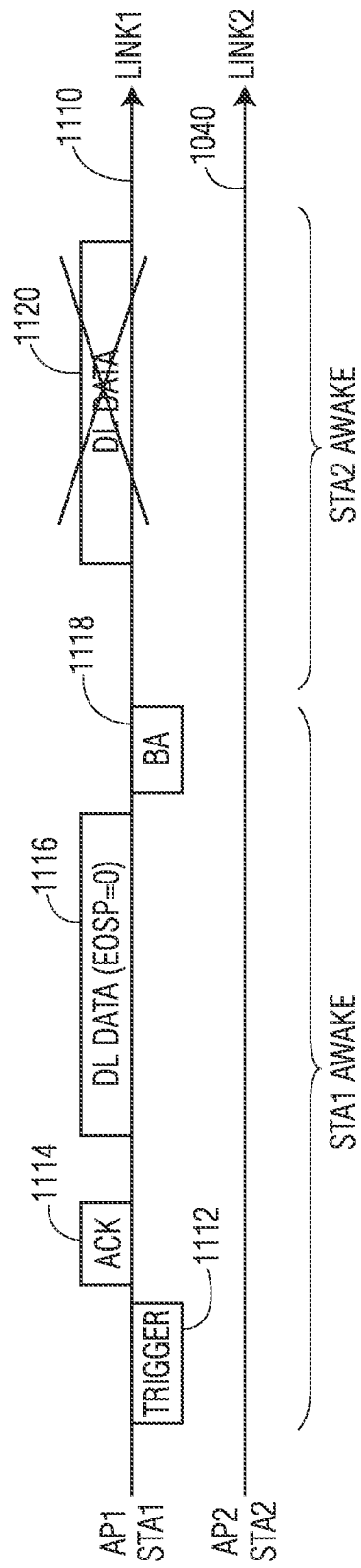
FIG. 11 illustrates another issue that arises is transition during the SP.

FIG. 11 illustrates another issue that arises is transition during the SP. If an SR MLD is in PS mode on both links 1110 and 1140:

when the SR MLD receives a Beacon frame where a bit in a partial virtual bitmap of a TIM element that corresponds to the SR MLD is set to 1, the SR MLD sends a PS Poll or a U-APSD Trigger frame 1112 on one link to retrieve DL frames;

then, the serving AP MLD responses with an ACK frame 1214 initiates a DL transmission 1116 to the SR MLD on the link and the STA sends a BA frame 1118; and however, before all the buffered frames are transmitted to the SR MLD (EOSP=0 and/or MD=1), if the SR MLD switches an operating link from the link to the other link, as the serving AP MLD does not know about the SR MLD's link switching, the serving AP MLD keeps transmitting the remaining frames 1120 on the link, which results in transmission failure.

In the current IEEE 802.11 standard, an unscheduled SP ends after the AP has attempted to transmit at least one BU using a delivery-enabled AC and destined for the STA, but no more than the number indicated in the Max SP Length field of the QoS Capability element of the STA's (Re) Association Request frame if the field has a nonzero value. However, if the SR MLD switches its link during the SP, it is not clear how to apply the Max SP Length information as the transmission includes multiple links.

A solution for addressing a transition between links during a SP will now be described. If an SR MLD intends to switch an operating link from a first link to a second link during a SP, the SR MLD transmits a first frame on the first link to a serving AP MLD to indicate that the SR MLD's operating link will change from the first link to the second link. Further variations of this solutions include the following:

the SP is an unscheduled service period for U-APSD operation;

after receiving an acknowledgement to the first frame from the serving AP MLD, the SR MLD switches its operating link to the second link in a predetermined time;

the serving AP transmits remaining DL frames on the second link a predetermined time after the transmission of the acknowledgement to the first frame to the SR MLD;

the first frame is a U-APSD trigger frame;

the first frame includes a link bitmap, wherein each bit in the link bitmap indicates the power save state of the SR MLD on corresponding link, wherein a first bit corresponding to the first link is set to a value indicating a Doze state and a second bit corresponding to the second link is set to a value indicating an Awake state;

the first frame includes a one bit indication, wherein a first value of the one bit indication indicates that the SR MLD switches is operating link to other link that is not current operating link (the first link);

the number of BUs delivered during the SP shall be no more than the number indicated in the Max SP Length field for the first link;

the number of BUs delivered during the SP on the first link shall be no more than the number indicated in the Max SP Length field for the first link;

the number of BUs delivered during the SP shall be no more than the minimum of the numbers indicated in the Max SP Length field for the first link and indicated in the Max SP Length field for the second link;

the number of BUs delivered during the SP shall be no more than the maximum of the numbers indicated in the Max SP Length field for the first link and indicated in the Max SP Length field for the second link; and if an SR MLD transmits a U-APSD trigger frame on a link, the operating link of the SR MLD shall be the link until the end of a service period that the U-APSD trigger frame initiates.

Figure 12:
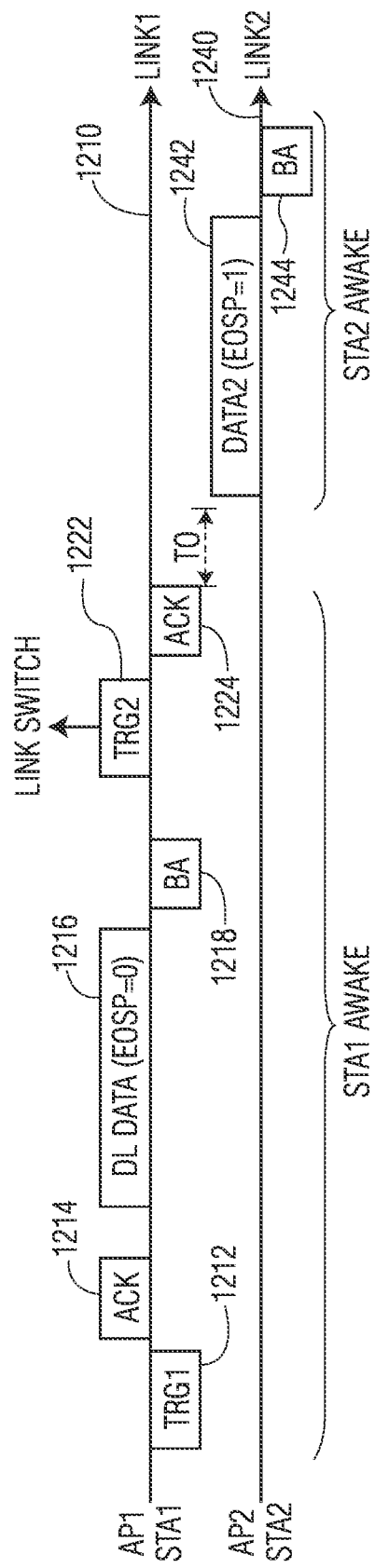
FIG. 12 illustrates an operation example of transition during a SP.

FIG. 12 illustrates an operation example of transition during a SP. The SR MLD is in PS mode on both links 1210 and 1240. When the SR MLD receives a Beacon frame where a bit in a partial virtual bitmap of a TIM element that corresponds to the SR MLD is set to 1, the SR MLD sends a U-APSD Trigger frame Trg1 1212 on link 1 1210 to retrieve DL frames 1216. The serving AP MLD initiates a DL transmission Data1 1216 to the SR MLD on Link 1 1210. The AP STA responds with a BA frame 1218. Before all the buffered frames are transmitted to the SR MLD (EOSP=0 and/or MD=1), the SR MLD sends another Trigger frame Trg2 1222 to indicate switching of an operating link from Link 1 1210 to Link 2 1240. After receiving Ack frame 1224 for Trg2 1222, the SR MLD switches its operating link to Link 2 1240 during T0 period. At T0 time after transmitting Ack frame, the AP MLD continues DL data frame transmission on Link 2 by transmitting DATA2 1242. The MLD STA responds with a BA frame 1240.

The system and method described herein may be carried out using specific hardware to perform the actions or software running on a processor may implement the embodiments. The processor may be connected to memory and storage, where the software instructions are stored in the storage. The processor may be any general purpose processor, a graphics processor, a signal processor, or any other type of specialized processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for power save operation by a non-access point (non-AP) multi-link device (MLD), wherein a plurality of links are established between the non-AP MLD and an AP MLD, the method comprising:
    setting, by the non-AP MLD, a QoS capability for a first 802.11 access category to a first state for all links of the plurality of links that the non-AP MLD operates;
    transmitting, by the non-AP MLD, a first management frame to the AP MLD, wherein the first management frame is used to request a multi-link setup with the AP MLD, and wherein the first management frame includes a first element that comprises the setting of the QoS capability for the first 802.11 access category;
    receiving, by the non-AP MLD, a second management frame from the AP MLD, wherein the second management frame includes information for an association ID (AID) that corresponds to the non-AP MLD, wherein the AID is assigned to the non-AP MLD regardless of the number of links in the plurality of links; and
    receiving, by the non-AP MLD, a third management frame from the AP MLD, wherein the third management frame comprises a partial virtual bitmap and a bit in the partial virtual bitmap corresponding to the AID is set to indicate if the first state is a nondelivery-enabled access category and the AP MLD has buffered buffer units (BU) of the first 802.11 access category for the non-AP MLD.

2. The method of claim 1, wherein the first management frame is an Association Request frame.

3. The method of claim 1, wherein the second management frame is an Association Response frame.

4. The method of claim 1, wherein the third management frame is a Beacon frame.

5. The method of claim 1, further comprising:
    setting, by the non-AP MLD, the QoS capability for a second 802.11 access category to a second state for all links of the plurality of links that the non-AP MLD operates;
    wherein the partial virtual bitmap and a bit in the partial virtual bitmap corresponds to the AID is set to indicate if the first and the second states are nondelivery-enabled access categories and the AP MLD has buffered BU of the first or the second 802.11 categories for the non-AP MLD.

6. The method of claim 1, wherein the QoS capability is indicated in a QoS Capability element of the first management frame.

7. The method of claim 1, wherein the QoS capability for the first 802.11 access category is 1 bit in length and set to 1 to indicate that the first 802.11 access category is both trigger-enabled and delivery-enabled.

8. The method of claim 1, further comprising setting, by the non-AP MLD, a QoS capability for a traffic stream parameters to a value for all links of the plurality of links that the non-AP MLD operates.

9. The method of claim 1, further comprising setting, by the non-AP MLD, a QoS capability for a Max service period (SP) Length to a value for all links of the plurality of links that the non-AP MLD operates.

10. The method of claim 1, further comprising transmitting, by the non-AP MLD, an add traffic stream (ADDTS) Request frame for an AC to the AP MLD, wherein an automatic power save delivery (APSD) subfield and the Schedule subfield value for the plurality of links shall be set to the same value.

11. A method for power save operation by a non-access point (non-AP) multi-link device (MLD), wherein a plurality of links are established between the non-AP MLD and an AP MLD, the method comprising:
setting, by the non-AP MLD, a wireless network monitor (WNM) Sleep interval value to a first value for all links of the plurality of links that the non-AP MLD operates;
transmitting, by the non-AP MLD, a first management frame to the AP MLD, wherein the first management frame is used to enter the WNM sleep mode, and wherein the first management frame includes a WNM Sleep Interval field including the WNM Sleep interval value set to the first value; and
receiving, by the non-AP MLD, a Beacon frame during the WNM Sleep interval.

12. The method of claim 11, wherein the first management frame is a WNM Sleep Mode Request frame.

13. The method of claim 11, wherein a WNM Sleep Interval field indicates how often the non-AP MLD in WNM sleep mode wakes to listen to Beacon frames.

14. The method of claim 11, wherein the Beacon frames may be on any of the plurality of links.

15. The method of claim 11, wherein the first management frame includes only one WNM Sleep Interval field.

16. A non-access point (non-AP) multi-link device (MLD) that includes power save operation, wherein a plurality of links are established between the non-AP MLD and an AP MLD, the non-AP MLD comprising:
a processor configured to set a QoS capability for a first 802.11 access category to a first state for all links of the plurality of links that the non-AP MLD operates;
a transmitter configured to transmit a first management frame to the AP MLD, wherein the first management frame is used to request a multi-link setup with the AP MLD, and wherein the first management frame includes a first element that comprises the setting of the QoS capability for the first 802.11 access category; and
a receiver configured to:
receive a second management frame from the AP MLD, wherein the second management frame includes information for an association ID (AID) that corresponds to the non-AP MLD, wherein the AID is assigned to the non-AP MLD regardless of the number of links in the plurality of links; and
receive a third management frame from the AP MLD, wherein the third management frame comprises a partial virtual bitmap and a bit in the partial virtual bitmap corresponds to the AID is set to indicate if the first state is a nondelivery-enabled access category and the AP MLD has buffered buffer units (BU) of the first 802.11 access category for the non-AP MLD.

17. The non-AP MLD of claim 16, wherein the first management frame is an Association Request frame.

18. The non-AP MLD of claim 16, wherein the second management frame is an Association Response frame.

19. The non-AP MLD of claim 16, wherein the third management frame is a Beacon frame.

20. The non-AP MLD of claim 16, wherein the processor is further configured to set the QoS capability for a 802.11 second access category to a second state for all links of the plurality of links that the non-AP MLD operates; and
wherein the partial virtual bitmap and a bit in the partial virtual bitmap corresponding to the AID is set to indicate if the first and the second states are nondelivery-enabled access categories and the AP MLD has buffered BU of the first or the second 802.11 access categories for the non-AP MLD.

21. The non-AP MLD of claim 16, wherein the QoS capability is indicated in a QoS Capability element of the first management frame.

22. The non-AP MLD of claim 16, wherein the QoS capability for the first 802.11 access category is 1 bit in length and set to 1 to indicate that the first 802.11 access category is both trigger-enabled and delivery-enabled.

23. The non-AP MLD of claim 16, wherein the processor is further configured to set a QoS capability for a traffic stream parameters to a value for all links of the plurality of links that the non-AP MLD operates.

24. The non-AP MLD of claim 16, wherein the processor is further configured to set a QoS capability for a Max service period (SP) Length to a value for all links of the plurality of links that the non-AP MLD operates.

25. The non-AP MLD of claim 16, wherein the transmitter is further configured to transmit an add traffic stream (ADDTS) Request frame for an AC to the AP MLD, wherein an automatic power save delivery (APSD) subfield and the Schedule subfield value for the plurality of links shall be set to the same value.

26. A non-access point (non-AP) multi-link device (MLD) that includes power save operation, wherein a plurality of links are established between the non-AP MLD and an AP MLD, the non-AP MLD comprising:
a processor configured to set a wireless network monitor (WNM) Sleep interval value to a first value for all links of the plurality of links that the non-AP MLD operates;
a transmitter configured to transmit a first management frame to the AP MLD, wherein the first management frame is used to enter the WNM sleep mode, and wherein the first management frame includes a WNM Sleep Interval subfield including the WNM Sleep interval value set to the first value; and
a receiver configured to receive a Beacon frame during the WNM Sleep interval.

27. The non-AP MLD of claim 26, wherein the first management frame is a WNM Sleep Mode Request frame.

28. The non-AP MLD of claim 26, wherein a WNM Sleep Interval field indicates how often the non-AP MLD in WNM sleep mode wakes to listen to Beacon frames.

29. The non-AP MLD of claim 26, wherein the Beacon frames may be on any of the plurality of links.

30. The non-AP MLD of claim 26, wherein the first management frame includes only one WNM Sleep Interval field.

* * * * *